US007305294B2

(12) United States Patent
Bate et al.

(10) Patent No.: US 7,305,294 B2
(45) Date of Patent: Dec. 4, 2007

(54) VEHICLE STOPPING SYSTEM AND METHOD

(75) Inventors: John G. Bate, Oak Ridge, NC (US); Christiano Blume, Curitiba (BR)

(73) Assignee: Volvo Trucks North America Inc.

( * ) Notice: Subject to any disclaimer, the term of this patent is extended or adjusted under 35 U.S.C. 154(b) by 273 days.

(21) Appl. No.: 10/783,968

(22) Filed: Feb. 21, 2004

(65) Prior Publication Data
US 2005/0187693 A1 Aug. 25, 2005

Related U.S. Application Data

(60) Provisional application No. 60/538,792, filed on Jan. 23, 2004.

(51) Int. Cl.
*B60T 8/32* (2006.01)
*G05D 1/00* (2006.01)
(52) U.S. Cl. .............................. 701/93; 701/70; 477/3; 477/4; 477/6; 303/122.04
(58) Field of Classification Search .................. 701/70; 340/426.12, 425.5, 426.19, 539.1, 825.72; 307/10.2, 10.3; 180/287
See application file for complete search history.

(56) References Cited

U.S. PATENT DOCUMENTS 4,292,620 A 9/1981 Pagane (Continued)

FOREIGN PATENT DOCUMENTS

WO WO 03/043838 A2 5/2003

(Continued)

OTHER PUBLICATIONS

A framework for supporting autonomous navigation in automobiles Taropa, E.; Srini, V.P.; Tack-Don Han;Software Technologies for Future Embedded and Ubiquitous Systems, 2006 and the 2006 Second International Workshop on Collaborative Computing, Integration, and Assurance. SEUS 2006/WCCIA 2006. The Fourth IEEE Workshop on,Apr. 27-28, 2006 pp. 6.*

(Continued)

*Primary Examiner*—Cuong Nguyen
(74) *Attorney, Agent, or Firm*—Potomac Patent Group PLLC

(57) ABSTRACT

A method of controlling a vehicle includes reducing a speed of the vehicle in response to a vehicle shutdown signal, monitoring at least one of a speed of the vehicle and a torque of an engine of the vehicle, determining whether the monitored at least one of the speed and torque is decreasing, if the monitored at least one of the speed and torque is not decreasing, enabling the engine of the vehicle to operate at a reduced power level, and stopping the vehicle when the monitored at least one of the speed and torque has reached a predetermined level. A control system for a vehicle includes a processor that reduces a speed of the vehicle in response to a vehicle shutdown signal. The processor monitors at least one of a speed of the vehicle and a torque of an engine of the vehicle and determines whether the monitored at least one of the speed and torque is decreasing. If the monitored at least one of the speed and torque is not decreasing, the processor enables the engine of the vehicle to operate at a reduced power level. The processor causes the vehicle to stop the vehicle when the monitored at least one of the speed and torque has reached a predetermined level. In addition, a computer-readable medium containing a computer program for controlling a vehicle.

14 Claims, 3 Drawing Sheets

U.S. PATENT DOCUMENTS

| | | |
|---|---|---|
| 4,363,999 A | 12/1982 | Preikschat |
| 4,878,050 A | 10/1989 | Kelley |
| 5,463,372 A | 10/1995 | Mawyer, Sr. |
| 5,513,244 A | 4/1996 | Joao et al. |
| 5,563,453 A | 10/1996 | Nyfelt |
| 5,638,044 A | 6/1997 | Chua |
| 5,819,869 A | 10/1998 | Horton |
| 5,925,940 A | 7/1999 | Donatelle et al. |
| 5,937,823 A | 8/1999 | Reeder et al. |
| 5,977,654 A | 11/1999 | Johnson et al. |
| 6,072,248 A | 6/2000 | Muise et al. |
| 6,249,215 B1 | 6/2001 | Dilz et al. |
| 6,313,740 B1 | 11/2001 | Goetz |
| 6,347,276 B1 | 2/2002 | Avery, Jr. |
| 6,459,980 B1 | 10/2002 | Tabata et al. |
| 6,504,472 B2 | 1/2003 | Machala et al. |
| 6,549,130 B1 | 4/2003 | Joao |
| 6,629,031 B2 | 9/2003 | Gustavsson et al. |
| 6,998,727 B2 * | 2/2006 | Gray, Jr. .................. 290/40 C |
| 2001/0016975 A1 | 8/2001 | Bellinger |
| 2001/0056544 A1 | 12/2001 | Walker |
| 2002/0157881 A1 | 10/2002 | Bakholdin et al. |
| 2003/0095046 A1 | 5/2003 | Borugian |
| 2003/0097218 A1 | 5/2003 | Borugian |
| 2003/0225501 A1 | 12/2003 | De La Salle et al. |
| 2005/0125134 A1 | 6/2005 | Iwatsuki et al. |

FOREIGN PATENT DOCUMENTS

| | | |
|---|---|---|
| WO | WO 03/044630 A2 | 5/2003 |
| WO | 2005/074454 A3 | 3/2007 |

OTHER PUBLICATIONS

Supervisory control of a HV integrated starter-alternator with ultracapacitor support within the 42 V automotive electrical system Spillane, D.; O' Sullivan, D.; Egan, M.G.; Hayes, J.G.; Applied Power Electronics Conference and Exposition, 2003. APEC '03. Eighteenth Annual IEEE, vol. 2, Feb. 9-13, 2003 pp. 1111-1117 vol. 2.*

Experimental study of sources hybridization electromechanical storage system integration into an electric vehicle structure, Briat O.; Vinassa, J.M.; Zardini, C.; Aucouturier, J.L.;Power Electronics Specialists Conference, 2001. PESC. 2001 IEEE 32nd Annual vol. 2, Jun. 17-21, 2001 pp. 1237-1242 vol. 2, Digital Object Identifier 10.1109/PESC.*

Drive system control and energy management of a solar powered electric vehicleGodoy Simoes, M.; Franceschetti, N.N.; Adamowski, J.C.; Applied Power Electronics Conference and Exposition, 1998. APEC '98. Conference Proceedings 1998., Thirteenth Annual, vol. 1, Feb. 15-19, 1998 pp. 49-55 vol. 1,Digital Object Identifier 10.1109/APEC.1998.6476.*

* cited by examiner

VEHICLE STOPPING SYSTEM AND METHOD

This application claims the benefit of U.S. Provisional Patent Application No. 60/538,792 filed on Jan. 23, 2004, by John G. Bate et al. for "Improved Vehicle Stopping System and Method. The entirety of that Provisional Patent Application is incorporated here by reference.

The present invention concerns vehicle recovery, for example during criminal events when there is need to disable the vehicle to prevent theft of cargo, or operating the vehicle in unauthorized manner or location. Disabling the vehicle in this invention is tied to an improved safety from the standpoint of the driver, the terrain, and the surrounding traffic environment.

BACKGROUND

In various countries in the world, we can find vehicle and vehicle cargo theft common-place. Certain historical events have also contributed to a growing need for additional safety in terms of both finding the vehicle as well as stopping the vehicle.

It is already common to see a vehicle stopped by the side of the road due to mechanical or electrical problems. In the future, it may be more common to see vehicles stopped due to some event that caused it to shutdown. However, even if a vehicle stopping system is never used, it is at least available.

Many vehicles today have a built in method of shutting off the engine to prevent damage to the engine. Instances of this include loss of oil or engine coolant, or some other failure that would, if left unchecked, damage the engine. The damage is usually prevented by the system initiating an internally triggered engine shutdown.

Many vehicles will typically have some kind of data communication device, sending information about the vehicle's operating state, messages to or from the driver, and keeping track of the vehicle and or cargo. The communication device may be short-range RF wireless, or long-range cellular phone or satellite-based or other type of carrier.

The communication link between the truck and another location (typically a dispatch station) may also keep track of the location of the vehicle for the sole purpose of ensuring that it stays on its planned path. Any deviation from this path may indicate theft—in some cases of extremely valuable cargo (real or perceived); theft may be the only reason the cargo strays from the scheduled path.

Some communication systems have a tight connection to the vehicle and vehicle operation. Many systems today have means of stopping the vehicle by disabling the engine, cutting fuel, etc. The engine shutdown mechanisms are typically simple. Stopping the fuel to the engine will typically bring the engine to a halt rather quickly.

Less simple methods may be better control on a road speed limit switch used in conjunction with the fuel shutoff. Additionally, if the connections are made to a vehicle's electrical control center, there is more control and better feed-back to the driver.

Some systems just stop the fuel flow. Others limit road speed first, then stop fuel flow. Others are connected to the electrical system and can limit road speed as well as stop the engine, both via electrical inputs.

U.S. Pat. No. 6,549,130 discloses an anti-theft system for remote actuation. The system can be programmed to control multiple parameters, such as timing, and/or the degree of disabling and re-enabling of various vehicle systems may be programmed.

U.S. Pat. No. 5,937,823 discloses an anti-theft system that monitors the speed and disables the engine when the speed falls below a pre-set value. The engine may also be controlled and gradually shutdown by interrupting the ignition system. See the abstract.

U.S. Pat. No. 6,504,472 B2 describes engine shutdown accomplished by opening/closing a relay which opens the ignition coil circuit.

U.S. Pat. No. 6,549,130 B1 discloses an external command that can disable the vehicle ignition system. Disablement only prevents the vehicle from restarting.

U.S. Pat. No. 6,249,215 B1 has a main idea to use vehicle-side analysis to allow the stopping of the vehicle only in an area deemed "traffic-safe". If unsafe, power is reduced; if safe, engine shutdown is executed. The Vehicle-side analysis device checks for safe/unsafe conditions. A second point is to use GPS—enter all unsafe areas in a database (DB), then use the vehicle's GPS location to determine if the vehicle is in a safe area. A third condition is to monitor air quality to identify if the vehicle is at a gas station. A fourth condition is to determine if the vehicle is being towed or carried by another vehicle. A fifth point is to progressively reduce the available engine power step-by-step or continuously. A sixth point is to allow shutdown only if the vehicle is parked.

U.S. Pat. No. 6,313,140 B1 describes a control system in a stolen vehicle that is operated to bring the stolen vehicle to a safe stop. One control system example could be fuel regulation, reducing the fuel supply rate to reduce the engine power until stalling or idling (and keeping the steering system operable). Other examples would be to activate the brakes, steering control, clutch, reducing amount of engine power passed through transmission.

U.S. Pat. No. 6,347,276 B1 discusses methods of writing to an EEPROM in an engine control unit.

U.S. Pat. No. 5,925,940 discusses methods of remotely applying the parking brake that can be applied while a vehicle is driving.

U.S. Pat. No. 5,937,823 discusses remote engine shutdown by receiving a command from a selective call radio. Shutdown is accomplished by interrupting the ignition intermittently if engine speed is greater than a pre-set value or immediately if engine speed is lower than the pre-set value. Engine speed is measured with a tachograph.

U.S. Pat. No. 5,977,654 discusses engine disablement after detection of an unauthorized vehicle startup. Engine shutdown is accomplished with a relay to disconnect the battery and ground the battery cable.

U.S. Pat. No. 6,072,248 discusses remote engine shutdown by multi-step fuel reduction control to fuel pump via engine module and intermittently pulsing fuel pump/supply, first to slow the vehicle to below idle speed, then to stall the engine with total fuel shut off.

U.S. Pat. No. 5,513,244 discusses prohibiting remote engine restart. The engine must be off before this can take place.

U.S. Pat. No. 5,563,453 discusses remote control of vehicle, and includes a vehicle locking system so as to lock the vehicle, and interrupting the voltage to one or more of the vehicle electrical circuits so as to deactivate the engine, close windows, etc.

U.S. Pat. Nos. 5,638,044 and 5,819,869 discuss remote engine shutdown by disconnecting the ignition coil.

U.S. Pat. No. 5,463,372 discusses basic engine shutdown by interrupting the electronic distributor or EFI control voltage. Intermittent interruption of the voltage would put the system in a partially disabled state, and full interruption would be a complete shutdown state.

U.S. Pat. No. 4,878,050 discusses vehicle control, decelerating, stopping after a delay (by control of either the engine timing or fuel supply), fuel disengage (with a mechanical plunger and membrane), engine disabling by use of a relay between ignition coil and spark plugs.

U.S. Pat. No. 4,292,620 discusses a vehicle disabling system actuated by low fuel level in tank. A hidden switch can be set such that a full tank of fuel looks like an empty tank. The shutdown mechanics connect a relay to the starter circuit, and also a means to turn off the engine and visual and audio driver feed-back. No external control and no control of road speed limiting is discussed.

Typical use scenarios for the need to shutdown the engine begin when some external event is received by the vehicle's communication system, translated into a shutdown command, and the engine shuts down. The police will probably know where the vehicle is at this time. The thief, realizing that his time may be up, leaves the vehicle where it stopped. The police, upon arriving at the vehicle, find that it is in a location that is very dangerous. This might be an intersection, train crossing, etc. There might be hazardous chemicals in the vehicle and it may have stopped near a populated center or on a bridge.

Some triggering events include but not limited to:
1. Vehicle moving outside a specified GPS location by some predetermined distance.
2. Vehicle getting close to a GPS location by some predetermined distance.
3. Driver-initiated via button.
4. Communication device command.
5. Communication device alarm system.
6. Vehicle alarm system.
7. Law enforcement controlled.

SUMMARY

What is needed is some adaptive shutdown system that gives the driver (police) a chance to move the disabled vehicle to a new location, safely, and out of the way. Another aspect of this invention is a safety factor never considered before: shutdown of the engine while driving down a hill. The typical command would shutdown the engine without regard to the terrain, not realizing that when the engine is stopped there may be no power to the brakes and or steering system or an ability to shift to a safer gear ratio. What is needed in this second situation is that the engine is allowed to keep running during these hill situations. The hill will end some time, but the need to control the vehicle from a safety standpoint is also important.

Applicants address these concerns with an invention that in one aspect provides a method of controlling a vehicle that includes the steps of reducing a speed of the vehicle in response to a vehicle shutdown signal, monitoring at least one of a speed of the vehicle and a torque of an engine of the vehicle, determining whether the monitored at least one of the speed and torque is decreasing, if the monitored at least one of the speed and torque is not decreasing, enabling the engine of the vehicle to operate at a reduced power level, and stopping the vehicle when the monitored at least one of the speed and torque has reached a predetermined level.

In another aspect, there is provided a control system for a vehicle that includes a processor that reduces a speed of the vehicle in response to a vehicle shutdown signal. The processor monitors at least one of a speed of the vehicle and a torque of an engine of the vehicle and determines whether the monitored at least one of the speed and torque is decreasing. If the monitored at least one of the speed and torque is not decreasing, the processor enables the engine of the vehicle to operate at a reduced power level. The processor causes the vehicle to stop the vehicle when the monitored at least one of the speed and torque has reached a predetermined level.

In yet another aspect, there is provided a computer-readable medium containing a computer program for controlling a vehicle. The computer program performs the steps of reducing a speed of the vehicle in response to a vehicle shutdown signal, monitoring at least one of a speed of the vehicle and a torque of an engine of the vehicle, determining whether the monitored at least one of the speed and torque is decreasing, if the monitored at least one of the speed and torque is not decreasing, enabling the engine of the vehicle to operate at a reduced power level, and stopping the vehicle when the monitored at least one of the speed and torque has reached a predetermined level.

BRIEF DESCRIPTION OF THE DRAWINGS

The several features, objects, and advantages of this invention will be apparent from reading this description in conjunction with the drawings, in which.

DETAILED DESCRIPTION

Figure 1:
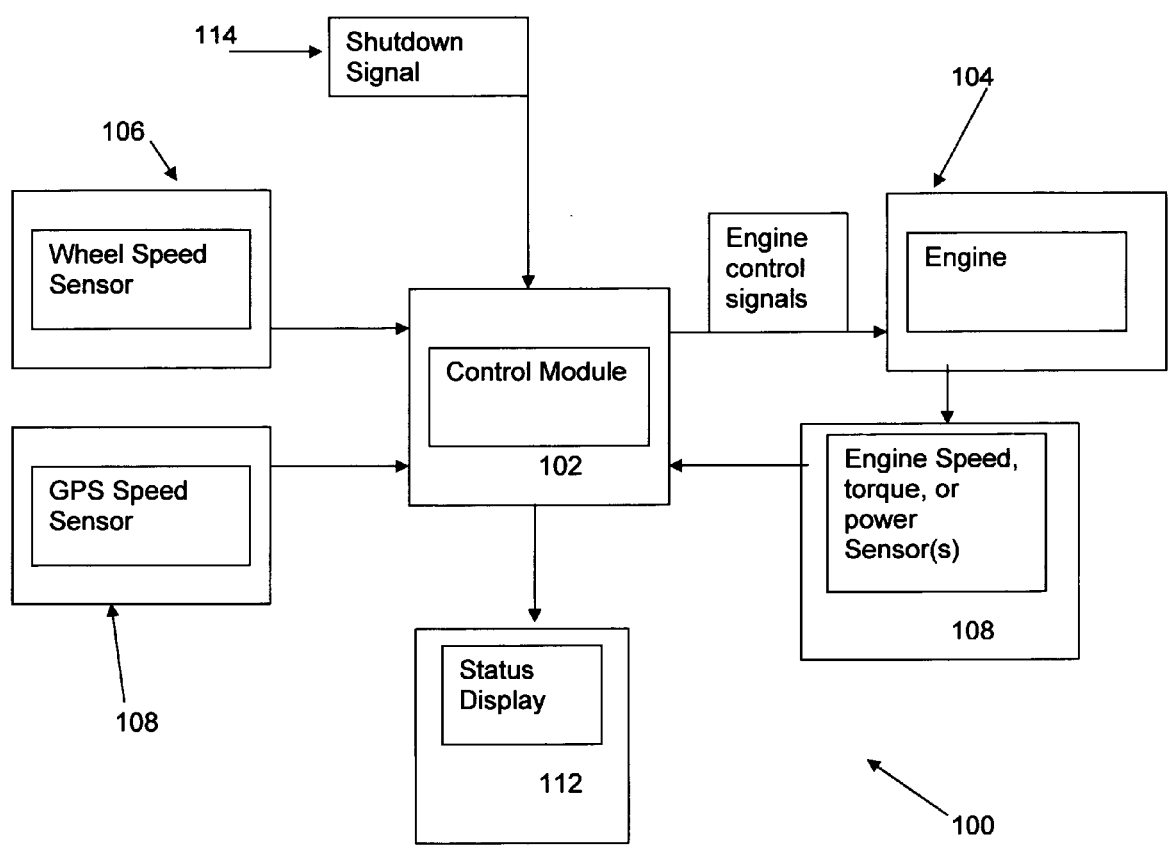
FIG. 1 is a block diagram of a system in accordance with Applicants' invention.

One part of this invention concerns engine shutdown during events, such as criminal events. As depicted in FIG. 1, the components of the system 100 include a controller and speed regulator 102 for the engine 104, speed, torque, and power sensors 106, 108, 110, a driver display 112, and a communication system 114 capable of receiving and sending coded messages to control the engine shutdown. Additional components include timers, which may be conveniently implemented in software in the control module 102. It will be understood that the engine 104 is responsive to control signals produced by the controller 102.

Figure 2:
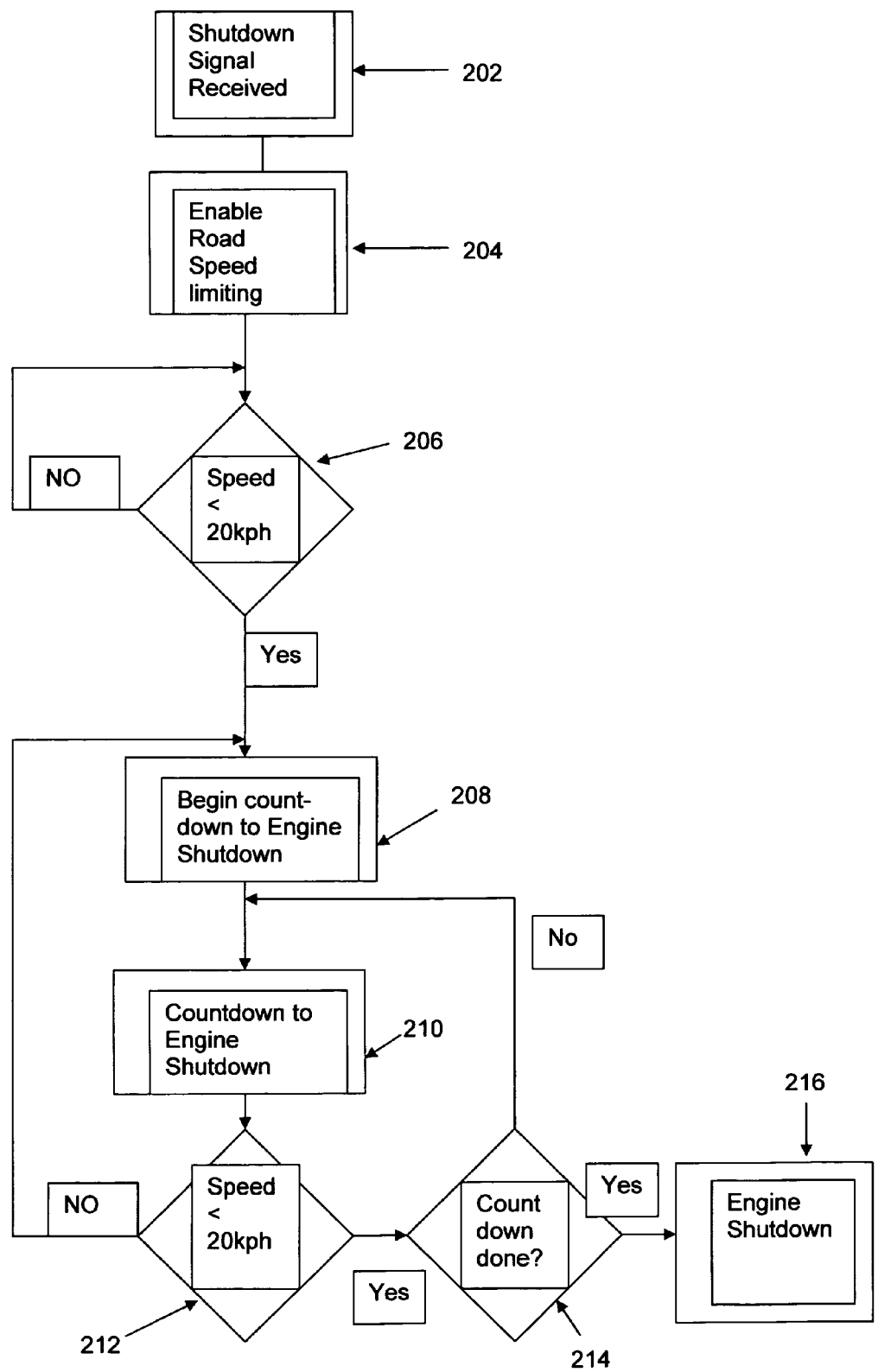
FIG. 2 is a flow chart of a method in accordance with Applicants' invention.

The receipt of a coded engine shutdown message would begin the sequence by warning the driver of the imminent engine shutdown via the display 112. An exemplary sequence is depicted in FIG. 2, with receipt of the shutdown signal indicated by step 202. One or more road speed sensors 106, 108 would identify the speed to the system. A road speed regulator, such as the brakes on the wheels, would be triggered to begin slowing the vehicle to a safe speed. This is depicted in FIG. 2 by step 204. "Safe" may mean about 20 kph or slower, but of course different conditions may require different "safe" speeds. It will be appreciated that regulating engine speed may be used instead of or together with the wheel brakes to slow the vehicle.

One form of this invention might use a torque regulator instead of a speed regulator. This would work to reduce or control engine torque rather than road speed. In modern vehicle engines, such torque control is readily implemented by production of suitable engine control signals by the engine controller 102. A signal to control the torque would prevent the vehicle from moving by reducing the torque generated by the engine 104. The first step of torque regulation may be to reduce torque by a predetermined amount, such as 50%. Another form of this invention would slowly decrease the torque output. The vehicle will eventually stop.

At some point, just prior to shutting down the engine an "engine shutdown" or "vehicle disabled" icon might be shown to the driver on the display 112. At that point the engine is off. As described in more detail below, the point of engine shutdown is permitted to occur after the "safe" speed is reached (step 206).

A second part of this invention concerns the control during dangerous driving situations—by this is meant when driving down a hill, for example. Gravity will play a big part in defining exactly when the vehicle will stop. If the road speed limit is applied and then engine stop command applied (as identified in flat road testing) then the vehicle will really be out of power, leading to crash potentials when lack of power controls steering and brakes. As depicted in FIG. 2, once the "safe" speed is reached, a countdown to engine shutdown begins (step 208) and continues (step 210) provided that the speed does not exceed the "safe" speed (step 212). Once the countdown has elapsed (step 214), the engine shutdown command is given (step 216). If the safe speed is exceeded during the countdown, for example because the vehicle has begun traveling down a steep hill, the countdown is re-started.

Figure 3:
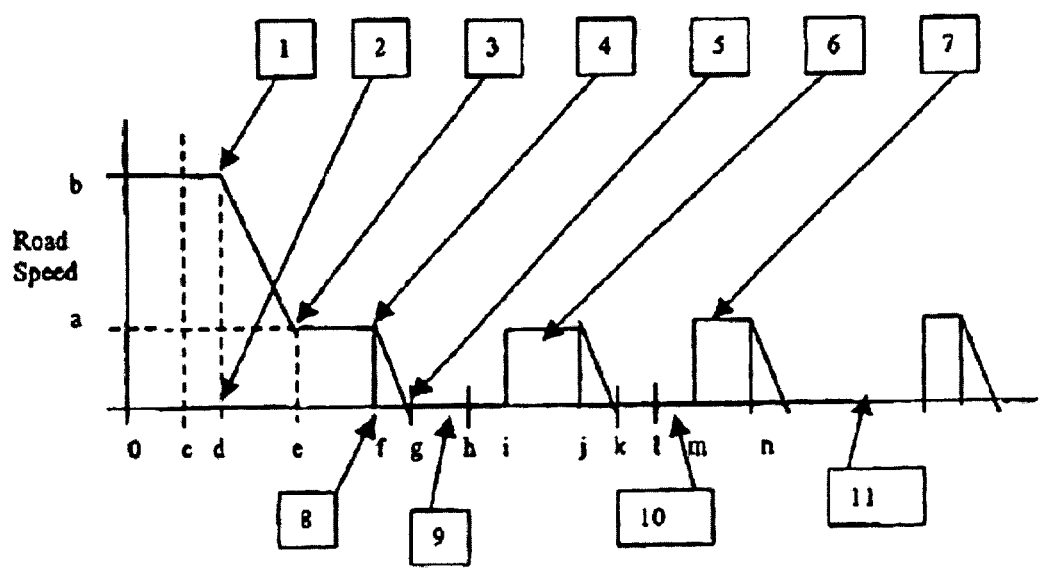
FIG. 3 is a timing diagram that schematically depicts variations of engine power or torque with respect to time.

Another main idea here is to allow multiple engine shutdown periods (or vehicle disabled periods) such that the vehicle may be moved as necessary during the subsequent engine shutdown periods. Such periods are depicted in FIG. 3, which is described in more detail below. One form would allow for variable delays between shutdown periods, some of which may be shorter (the second may be shorter than the first, the third shorter than the second, etc.) or longer (the second may be longer than the first, the third longer than the second, etc.). Another form allows for variable times between engine shutdown periods, possibly with an ignition key cycle required. Another form allows for variable times of engine enabling. Another form allows for these delays to be controlled by initial road speeds, vehicle mass (as calculated by torque requirements). Another form allows that engine enable periods are based on distance traveled—in this case the distance might be limited to enough to move the vehicle out of an intersection, off the railroad tracks, or off a bridge.

The main idea would also allow installation on any type of vehicle transmission.

One form of this invention includes an immediate engine shutdown without slowing the road speed during the process (possibly with a warning to the driver). This case will cover the cases when extra hardware is not installed on the vehicle to effect the road speed or torque limiting functions. Another form of this invention would control the fuel to the engine to simulate an empty fuel tank or faulty injectors on one or more cylinders. Another form of this invention includes an immediate engine shutdown if the vehicle is already at zero speed. Another form of this invention requires that the driver must actually stop the vehicle before the engine shutdown is accomplished. The idea might also require the driver to set the parking brake.

As described above, another form of this invention would allow the system to slowly decrease the road speed limit or maximum torque such that the system ends with a net result of zero speed after a period of time. The period of time (the length of the countdown in FIG. 2) would be dependent on the terrain (hills) and or vehicle load. At each point of time the system reduces the road speed or torque thereby reducing the speed and or power available to the vehicle. Another form would allow the system to step-wise decrease the road speed limit or maximum torque. One form of this invention would control the vehicle only such that at the end the engine is still operating but just enough to allow power steering and possibly operate a refrigeration system.

One form of this invention allows the last component of the engine shutdown to be temporarily delayed while the vehicle is traveling down a hill (i.e., the road speed and or torque requirements demand continued vehicle operation for safety and controllability).

The timings of the controls effected by this invention in one example are depicted in FIG. 3, in which the vertical axis is road speed or torque availability, with a<b. The horizontal axis is time, with time c earlier than time n. At time c, the command is received to shut the engine, and a warning is displayed to driver. At time d, the system 100 limits the road speed or torque, and vehicle slowdown is in progress. At time e, the vehicle achieves a road speed limit or torque limit, i.e., the vehicle is allowed to operate in a very much reduced manner. At times f and g, the system shuts down the vehicle engine or sets the maximum road speed to zero, or limits the torque to just allow engine idle operation. At times g, h, l, the system is disabled, and may be waiting for timer or key cycle. Times i, j, k and m and n depict multiple engine-enabled periods.

It should be understood that at points 1 and 2 (time d), an immediate engine shutdown is optional. Between points 3 and 4 (times e and f, respectively), a delay before engine-shutdown can be had, and driver warnings may be displayed. At points 4 and 5 (times f and g), an immediate shutdown from the already reduced speed can be had. Optionally, the system can require that the driver stop the vehicle before completing the engine shutdown. At points 6 and 7 (time periods i-j and m-n), the engine and or vehicle is enabled at a reduced operational mode. Point 5 and point 6 do not necessarily have to be the same time, i.e., the periods f-g and j-k do not need to be equal, nor does the road speed or torque limit have to be the same. At points 9, 10, and 11 (time periods g-i, k-m, and >n), the vehicle is disabled. The times do not necessarily have to be the same, and the engine may be idling or at a reduced torque setting.

It will be appreciated that procedures described above may be carried out repetitively as necessary to control a vehicle. To facilitate understanding, many aspects of the invention are described in terms of sequences of actions that can be performed by, for example, elements of a programmable computer system. It will be recognized that the various actions could be performed by specialized circuits (e.g., discrete logic gates interconnected to perform a specialized function or application-specific integrated circuits), by program instructions executed by one or more processors, or by a combination of both.

Moreover, the invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM).

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method of controlling a vehicle, the method being implemented by apparatus in the vehicle, comprising the steps of:
    reducing a speed of the vehicle in response to a vehicle shutdown signal,
    monitoring at least one of a speed of the vehicle and a torque of an engine of the vehicle, wherein the speed monitoring is performed from the vehicle,
    determining whether the monitored at least one of the speed and torque is decreasing,
    if the monitored at least one of the speed and torque is not decreasing, enabling the engine of the vehicle to operate at a reduced power level, and
    stopping the vehicle when the monitored at least one of the speed and torque has reached a predetermined level.

2. The method of claim 1, wherein the vehicle shutdown signal is generated in response to a predetermined condition.

3. The method of claim 2, wherein the predetermined condition is at least one of use of the vehicle by an unauthorized operator, position of the vehicle in an unauthorized location, and failure to enter a predetermined code.

4. The method of claim 1, wherein the vehicle shutdown signal is transmitted to the vehicle.

5. The method of claim 1, wherein the reduction is initiated by at least one of actuating a brake of the vehicle, reducing the torque generated by the engine of the vehicle, interrupting a fuel supply to the engine of the vehicle, and controlling a transmission of the vehicle.

6. The method of claim 1, wherein after stopping the vehicle, the engine of the vehicle can be started in response to a second predetermined condition.

7. A control system for a vehicle, comprising a processor that reduces a speed of the vehicle in response to a vehicle shutdown signal, wherein the processor monitors at least one of a speed of the vehicle from the vehicle and a torque of an engine of the vehicle; the processor determines whether the monitored at least one of the speed and torque is decreasing; if the monitored at least one of the speed and torque is not decreasing, the processor enables the engine of the vehicle to operate at a reduced power level; and the processor causes the vehicle to stop the vehicle when the monitored at least one of the speed and torque has reached a predetermined level.

8. The control system of claim 7, wherein the vehicle shutdown signal is generated in response to a predetermined condition.

9. The control system of claim 8, wherein the predetermined condition is at least one of use of the vehicle by an unauthorized operator, position of the vehicle in an unauthorized location, and failure to enter a predetermined code.

10. The control system of claim 7, wherein the vehicle shutdown signal is transmitted to the vehicle.

11. The control system of claim 7, wherein the processor reduces the speed of the vehicle by causing at least one of actuation of a brake of the vehicle, reduction of the torque generated by the engine of the vehicle, interruption of a fuel supply to the engine of the vehicle, and control of a transmission of the vehicle.

12. The control system of claim 7, wherein after the vehicle has stopped, the processor enables the engine of the vehicle to be started in response to a second predetermined condition.

13. A computer-readable medium containing a computer program for controlling a vehicle, wherein the computer program performs the steps of:
    reducing a speed of the vehicle in response to a vehicle shutdown signal,
    monitoring at least one of a speed of the vehicle and a torque of an engine of the vehicle, wherein the speed monitoring is performed from the vehicle,
    determining whether the monitored at least one of the speed and torque is decreasing,
    if the monitored at least one of the speed and torque is not decreasing, enabling the engine of the vehicle to operate at a reduced power level, and
    stopping the vehicle when the monitored at least one of the speed and torque has reached a predetermined level.

14. A method of controlling a vehicle, the method being implemented by apparatus in the vehicle, comprising the steps of:
    controlling the vehicle to reduce a speed of the vehicle in response to a vehicle shutdown signal;
    monitoring at least one of a speed of the vehicle and a torque of an engine of the vehicle, wherein the speed monitoring is performed from the vehicle;
    determining whether the monitored at least one of the speed and torque is decreasing;
    if the monitored at least one of the speed and torque is decreasing, stopping the vehicle when the monitored at least one of the speed and torque has reached a predetermined level;
    if the monitored at least one of the speed and torque is not decreasing, enabling the engine of the vehicle to operate at a reduced power level until the monitored at least one of the speed and torque begins to decrease; and
    stopping the vehicle when the monitored at least one of the speed and torque has reached a predetermined level.

* * * * *